United States Patent [19]
Gruen et al.

[11] 3,936,955
[45] Feb. 10, 1976

[54] DRIVER TRAINING SIMULATOR

[75] Inventors: Herbert Gruen, Brooklyn; Kenneth R. Wisner, New York; Tony Karp, Briarwood, all of N.Y.

[73] Assignee: Driver Training Institute, Brooklyn, N.Y.

[22] Filed: Dec. 17, 1974

[21] Appl. No.: 533,519

[52] U.S. Cl. .................... 35/11; 46/244 A; 273/1 E
[51] Int. Cl.² ........................................... G09B 9/04
[58] Field of Search ............ 35/11 R, 12 S; 273/1 R, 273/1 E; 46/244 R, 244 A, 244 B

[56] References Cited
UNITED STATES PATENTS

| | | | |
|---|---|---|---|
| 2,870,548 | 1/1959 | Chedister | 35/11 R |
| 3,071,874 | 1/1963 | Chedister | 35/11 R |
| 3,231,987 | 2/1966 | Schott et al. | 35/11 R |
| 3,266,173 | 8/1966 | Sheridan | 35/11 R |
| 3,605,334 | 9/1971 | Genin | 35/11 R |
| 3,647,210 | 3/1972 | Ratcliffe | 35/11 R X |
| 3,740,870 | 6/1973 | Acker et al. | 35/11 R |

*Primary Examiner*—Wm. H. Grieb
*Attorney, Agent, or Firm*—Hopgood, Calimafde, Kalil, Blaustein & Lieberman

[57] ABSTRACT

A driver training simulator apparatus is disclosed which provides accurate simulation of the operation of the steering wheel and clutch. The resistance of the steering wheel to a turning force is greater when the simulated training vehicle is at rest than when the vehicle is moving. The simulated clutch offers a progressively different resistance to movement of the clutch pedal depending on the degree of engagement or disengagement of the simulated clutch. Also provided in the simulator is a stall sensor which causes the simulated vehicle to "stall" while also providing an indication of the occurrence of a stall when predetermined simulated conditions of engine speed and load are present in the simulated vehicle.

40 Claims, 10 Drawing Figures

DRIVER TRAINING SIMULATOR

The present invention relates generally to driver training apparatus, and more particularly, to an apparatus of this type offering a more realistic simulation of actual driving conditions.

The use of a training simulator as an aid in teaching driving techniques is well known and has long been generally accepted as a highly advantageous means for instructing students in the various operations involved in driving a vehicle, such as an automobile or truck. In such an apparatus, the student driver is typically seated in a console of a vehicle which includes a steering wheel, accelerator, brake pedal, and where applicable, a clutch pedal.

In many of the known simulators, a reduced-sized model vehicle contains steering and speed controls that are remotely operated in response to the student's operation of the various controls in the console. The student driver learns to operate the vehicle by observing the effects of his operations on the model vehicle, and by adjusting those operations to bring about the desired movement of the model vehicle, such as starting, steering, and stopping the vehicle. The student driver by the use of such a simulator can within a relatively short time become an effective driver without ever driving an actual vehicle. This technique is highly advantageous and economical since it avoids the need for providing an actual vehicle for each student, and more importantly, prevents damage to an actual vehicle which would probably result when an unskilled and untrained driver is required to learn his skills on an actual vehicle.

In order for this learning experience to be most effective, the simulated driving conditions should present, as closely as possible, the actual conditions the student will experience when he drives an actual vehicle, at which time the margin for driving error is at a minimum. For example, as disclosed in the Chedister U.S. Pat. No. 2,870,548, the steering wheel and clutch pedal of the vehicle simulator are designed to simulate the conditions of feel of the clutch and steering wheel in an actual vehicle. Other patents disclosing clutch and steering simulators are the Acker et al U.S. Pat. No. 3,740,870 and the Ratcliffe U.S. Pat. No. 3,647,210. These known devices, however, are relatively complex and moreover often do not provide the student with a true-to-life simulation of the controls of an actual vehicle. In addition, no driver training simulator has been developed in which an indication of a stall is presented to the student when the conditions for a stall are present in the simulated vehicle, although such an indication is of significant benefit to the student to assist him in preventing future stall conditions.

It is thus an object of the invention to provide a driver training simulator that provides the student with a more realistic simulation of actual driving conditions.

It is a further object of the invention to provide a driver training simulator that provides a realistic simulation of clutch and steering wheel operation.

It is another object of the invention to provide a driver training simulator of the type described in which an indication of stall of the simulated vehicle is reliably given upon the existence of predetermined stall conditions.

To these ends, the present invention provides a driver training simulator which includes a console having a brake pedal, clutch pedal, steering wheel and accelerator pedal. A small-scale model vehicle has control elements therein which respond, such as by remote control, to the operation of the console controls so that the student driver operating the console controls "drives" the model vehicle; that is, the model vehicle follows the movements of the console controls.

In one aspect of the invention, the resistance to turning the steering wheel is relatively high when the simulated vehicle is at rest and relatively low when the simulated vehicle is in motion. In another aspect of the invention, the resistance to movement of the clutch pedal is progressively greater during the disengagement of the clutch, and is then progressively decreased as the clutch is engaged in the manner of an actual clutch.

In yet another aspect of the invention, the load and speed of the simulated vehicle are both sensed to develop a "stall" signal upon the sensing of a predetermined stall condition. At this time, the model vehicle is stopped and a visual stall indication is provided. When the simulated vehicle is restarted, the stall condition is removed, and normal vehicle operation resumes so long as the student avoids a reoccurrence of a stall condition.

To the accomplishment of the above and to such further objects as may hereinafter appear, the present invention relates generally to a driver training simulator, substantially as defined in the appended claims and as described in the following specification taken together with the accompanying drawings in which:

Figure 1:
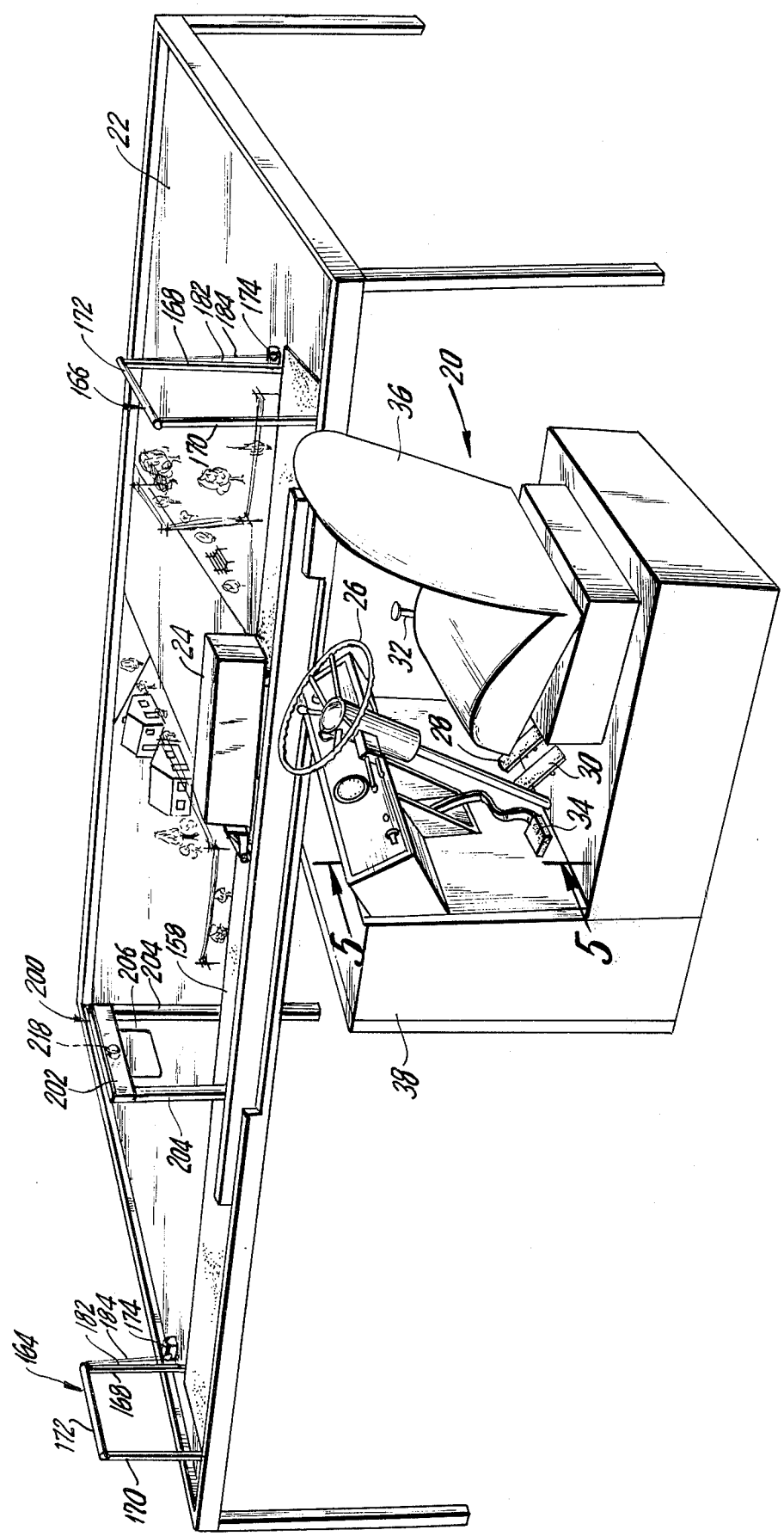
FIG. 1 is a perspective view of the driver training apparatus of the invention illustrating the console and the model vehicle controlled by the student driver in the console.
Figure 2:
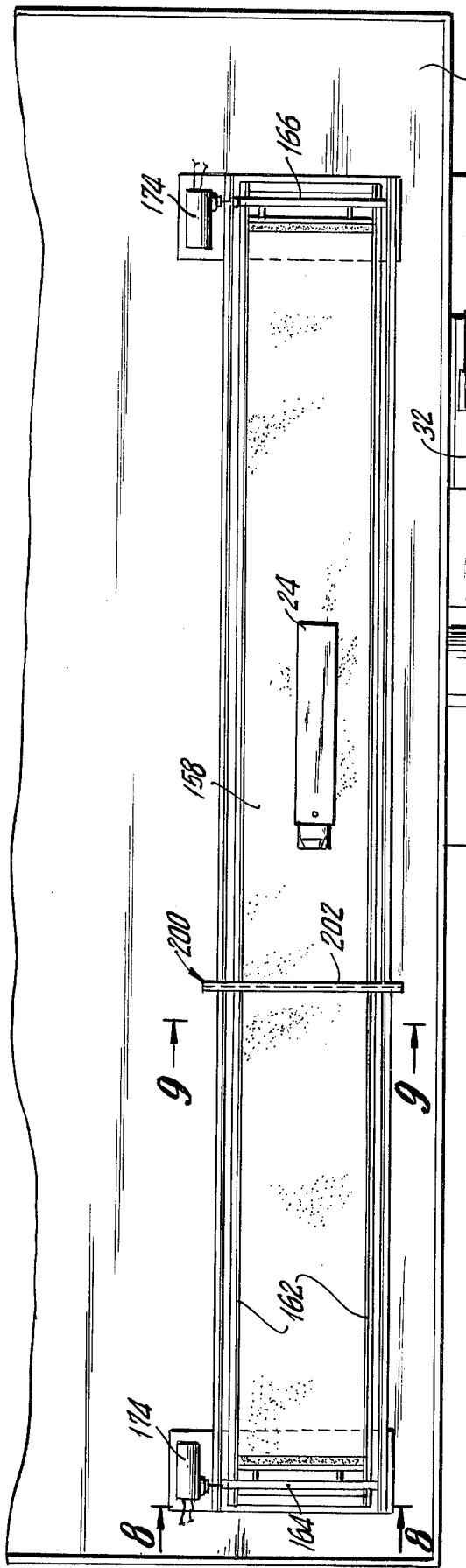
FIG. 2 is a plan view of the console and a portion of the vehicle platform.
Figure 3:
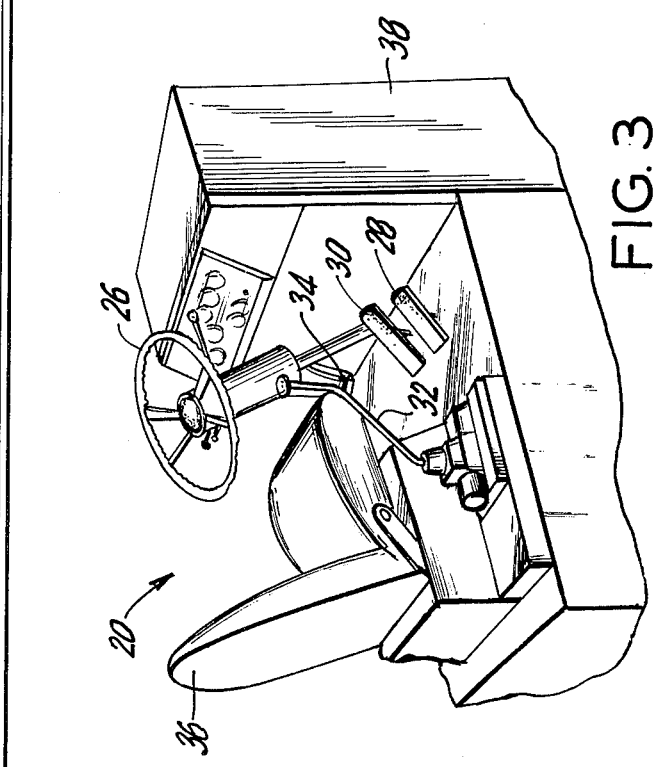
FIG. 3 is a perspective fragmentary view of the console as viewed from the opposite direction than in FIG. 1.

The present invention is directed to improvements in a vehicle training simulator of the type illustrated in FIGS. 1 to 3 wherein is shown a simulator for use in teaching the operation of a truck, although the simulator of the invention may be used to equal advantage in teaching the techniques of driving other vehicles such as automobiles, buses, and the like.

As shown in FIGS. 1 to 3, the simulator includes a simulated console generally designated 20 and an adjacent table 22 on which a miniaturized or model vehicle, here shown as a model truck 24, is placed and is free to move. Also on table 22 is a model of a typical driving environment including streets, houses, trees and the like, through which the student is to drive the model vehicle.

To this end, as is conventional, the model vehicle 24 contains signal receivers, servos, motors, and the like, which respond to signals transmitted from the console produced by the operation of the control elements in the console, such as a steering wheel 26, an accelerator pedal 28, a brake pedal 30, a gear shift lever 32, and a clutch pedal 34. The model vehicle 24 can be started, stopped, steered, speeded up, and slowed down in response to the operation of these controls by a student seated on a seat 36 in the console much as he would do were he driving an actual vehicle.

By operating the controls, which are of actual size, and by observing the resulting movement of the model vehicle, the student driver can readily learn to operate an actual vehicle without the risk of damage to the actual vehicle during the period of instruction. The concept of controlling a miniaturized vehicle from a remote console is not broadly new and, as such, is not considered to be a part of the present invention. Since the manner of achieving such control is known (see, for example, Schott et al U.S. Pat. No. 3,231,987, and Genin U.S. Pat. No. 3,605,334) no further description of this portion of the simulator of FIGS. 1–3 is provided in this specification.

The present invention is directed toward certain improved aspects of the simulator including an improved clutch simulator that simulates the feel or resistance of the clutch pedal during the periods of clutch disengagement and engagement; an improved steering wheel simulator which simulates the different resistance or stiffness of the steering wheel, when the vehicle is at rest as compared to when it is in motion; and a vehicle stall indicator. Also provided is a ramp simulator and height level indicator to provide improved judgment of vehicle operation on an incline and in low height-clearance conditions.

Clutch Simulation

Figure 5:
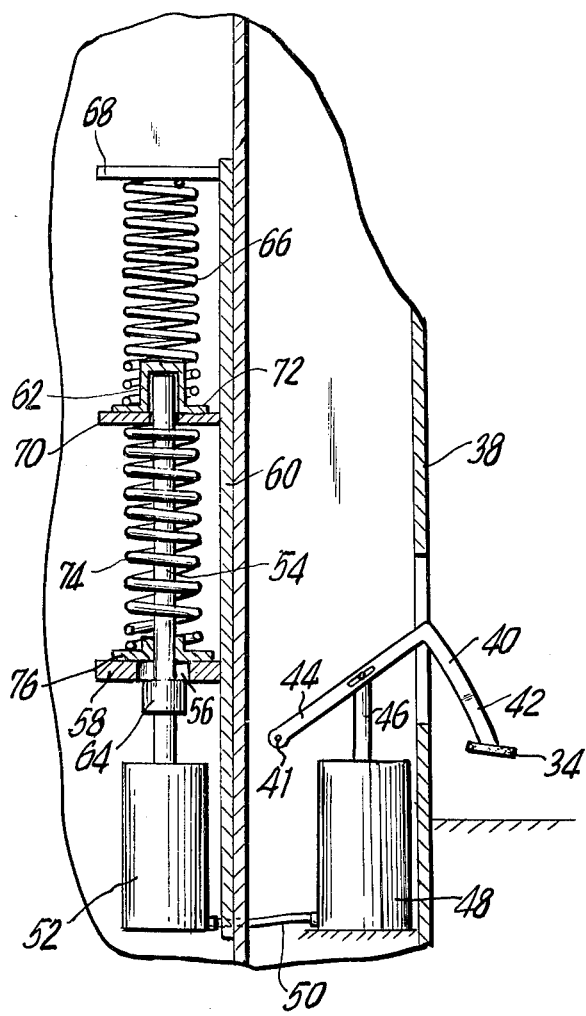
FIG. 5 is an elevation of the clutch simulator of the apparatus.

The clutch simulator, as well as the steering wheel simulator and other control elements of the system, are contained in a panel 38 mounted on the console. As shown in FIG. 5, the clutch simulator includes a linkage 40 pivotable about a pivot point 41 and including an arm 42 to which the clutch pedal 34 is affixed at one end. The other arm 44 of linkage 40 is located within the panel 38 and has one end of a piston rod 46 affixed thereto, which in turn, is connected to a piston capable of vertical motion within a master hydraulic cylinder 48.

A hydraulic conduit 50 extends between an output port of master cylinder 48 and an inlet port of a slave hydraulic cylinder 52 from which a rod 54 extends. Rod 54 passes through an opening 56 formed in a plate 58 extending transversely from a wall 60 and carries at its upper end a cup 62. A collar 64 is affixed to the lower end of rod 54 and is normally located, as shown in FIG. 5, below plate 58 and is of a diameter permitting it to pass through opening 56.

A first spring 66 is compressed between vertically spaced plates 68 and 70 and has its upper end abutting plate 68. As shown in FIG. 5, cup 62 normally rests on plate 70 and is received within the interior of spring 66. The lower end of the spring 66 rests on a lower circular flange 72 of cup 62. A second spring 74, preferably having a higher spring constant than that of spring 66, surrounds the upper portion of rod 54 and has its upper end abutting the underside of plate 70. The lower end of spring 74 is abutted against a flanged member 76 which rests on plate 58 and also surrounds rod 54.

In the operation of the clutch simulator of FIG. 5, the student desiring to shift gears, presses downward on the clutch pedal 34. This causes rod 46 to move in a downward direction to increase the pressure on the hydraulic fluid in master cylinder 48 in turn to increase the hydraulic pressure in cylinder 52. In this condition, spring 66 becomes compressed by the action thereon of rod 54 through cup 72, and as the clutch pedal is further pressed down, rod 54 is moved steadily upwards thereby creating a progressively increasing compression force on spring 66 which force is sensed by the student. At a certain position of the clutch pedal, as its downward motion is continued, collar 64, which has been gradually moving upwardly along with rod 54, will come into contact with flanged member 76, causing the latter to begin to compress spring 74. This position corresponding to the initial disengagement of the simulated clutch and creates a sudden abrupt increase in the resistance to further downward movement of the clutch pedal since such further movement now causes the increasing compression of both springs 66 and 74, which resistance again gradually increases with increasing downward movement of the clutch pedal.

To thereafter engage the clutch, the clutch pedal is raised causing rod 46 to move upward reducing the pressure on the fluid in cylinder 48. This, in turn, decreases the pressure in cylinder 52 and causes rod 54 to move downwardly, as viewed in FIG. 5. The initial downward movement of rod 54 gradually reduces the compression on springs 66 and 74, thereby reducing the force at the clutch pedal. Upon further upward movement of the clutch pedal, rod 54 moves further downward until collar 64 is moved away from contact with flanged member 76, corresponding to simulated clutch engagement, at which time the force at the clutch pedal is abruptly decreased, since spring 74 is no longer being compressed. Still further upward movement of the clutch pedal causes further downward movement of rod 54, thereby gradually reducing the compression on spring 66. This gradual decrease in spring compression continues until the clutch pedal is released. The force felt at the clutch pedal both prior to and following simulated clutch disengagement as well as prior to and following simulated clutch engagement thus closely simulates the force felt by the student driver during operation of the clutch pedal in an actual vehicle, as desired. The spring constants of springs 66 and 74 are preferably selected to achieve optimum accuracy of simulation of the actual feel of a clutch pedal.

Steering Wheel Simulation

Figure 6:
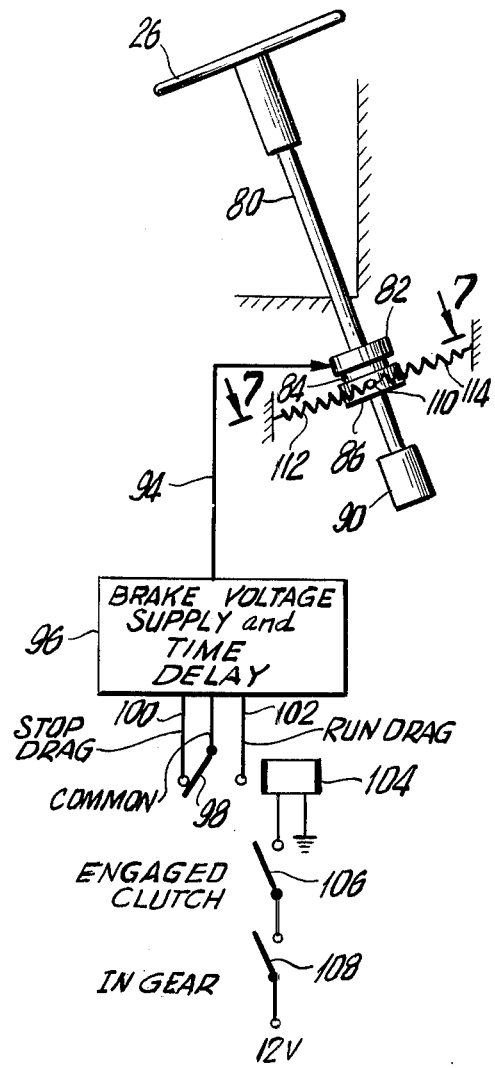
FIG. 6 is a view partly schematic and partly in elevation of the steering wheel simulator of the apparatus.
Figure 7:
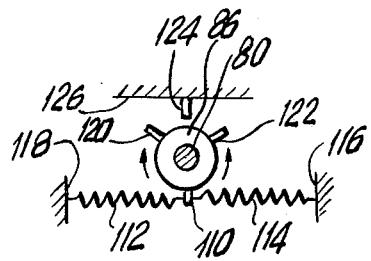
FIG. 7 is a section taken in the direction of the arrows 7—7 in FIG. 6.

In the operation of an actual vehicle, the resistance to movement of the steering wheel when the vehicle is at rest (and the clutch and drive gears are disengaged) is greater than when the vehicle begins to move (following the engagement of the clutch and drive gears) and is also increased the further the steering wheel is turned away from a straight ahead position. The steering wheel simulator illustrated in FIGS. 6 and 7 presents to the student driver these same variations in resistance to movement as the student operates the simulated training vehicle. As there shown, the steering wheel 26 is mounted on one end of a shaft 80, which is affixed to a section 82 of a magnetic brake 84, and drives a multi-turn rotation position potentiometer 90. The latter produces a rotation position voltage in accordance with the rotative position of shaft 80 in a known manner. Another section 86 of brake 84 rests adjacent brake section 82. Section 86 is positioned about shaft 80 and is axially movable along the shaft toward and away from section 82 in accordance with the magnetic force developed by section 82.

The force of magnetic brake 84, which determines the resistance to rotation (or torque) of shaft 80 and thus of the steering wheel 26, is thus proportional to the magnitude of a control voltage applied to brake section 82 over a line 94, which, in turn, determines the magnitude of the magnetic force of section 82 on section 86 to bring the latter into more intimate physical contact with the former, when the magnetic force is at its higher level. The increased physical contact, in turn, increases the braking force of the brake 84 on the steering wheel, as desired.

That control voltage is obtained from a brake voltage supply circuit 96 which produces on line 94 a voltage at one of two levels of a magnitude depending on the position of a common contact 98. (Circuit 96, which is otherwise not further disclosed herein, preferably includes a time delay circuit, such as a conventional R-C circuit, to establish a transition voltage between the two voltage levels produced by the circuit.)

As shown in FIG. 6, contact 98 is movable between two positions; that is, between a Stop Drag contact 100 and a Run Drag contact 102, depending on whether or not a relay 104 is energized by being connected to a 12-volt supply upon the closing of both an Engaged Clutch contact 106 and an In Gear contact 108. Those contacts are in turn closed upon the energizing of corresponding relays (not shown) upon the engaging of the simulated clutch (such as described previously with respect to FIG. 5) and the simulated engagement of gears upon the operation of the gear shift lever.

In operation, when the clutch is depressed (not engaged) or the simulated transmission is in neutral, relay 104 is unenergized and the common contact 98 is in the position shown in FIG. 6 in contact with the Stop Drag Contact 100. Under this condition, the brake voltage applied to the magnetic clutch is at the high value, thereby causing magnetic brake 84 to develop a high torque or high resistance to the movement of the steering wheel. When the simulated clutch is engaged and the simulated drive gears are engaged, contacts 106 and 108 are both closed and relay 104 is energized to cause the common contact 98 to move into contact with the Run Drag contact 102, whereupon the brake voltage is gradually decreased to its low value, thereby decreasing the torque produced by the magnetic brake and reducing the resistance to rotative movement of the steering wheel. It will thus be appreciated that the resistance to the rotation of the steering wheel is high when the simulated vehicle is at rest, and gradually decreases to a low level as the simulated clutch is engaged and the simulated vehicle is in motion, in the same manner as in an actual vehicle.

To further simulate the true operation of a steering wheel, the resistance to motion of the wheel is increased as the steering wheel is moved in either direction away from a straight ahead position. To this end, brake section 86 carries a pin 110 to which one end of tension springs 112 and 114 are respectively attached. The other ends of the springs are attached to fixed surfaces 116 and 118, respectively, such that as shaft 80 is rotated in either direction, as indicated by the arrows in FIG. 7, one of the springs 112, 114 is stretched whereas the other spring is relieved, such that the torque on the steering wheel is increased by an amount proportional to the stretching of one of the springs.

Section 86 also carries circumferentially spaced pins 120 and 122 and a stop 124 is affixed to a wall surface 126, such that when either of pins 120 or 122 contacts stop 124 upon the rotation of the shaft, further rotation of brake section 86 is prevented so as not to damage the springs while more effectively simulating the breakaway torque effect of the steering operation when the simulated vehicle is stationary.

Stall Sensor and Indicator

One of the common problems faced by student drivers is the propensity to create a stall condition for the simulated vehicle by failing to provide sufficient fuel to the engine upon an increase in engine torque requirement, such as when the simulated vehicle is moving up an incline. The training simulator of the invention includes a stall sensor and indicator, which upon the existence of a stall condition, such as a reduction in the speed of the drive motor to below a minimum value, or the existence of a specified combination of motor speed and torque in the simulated vehicle, will cause the vehicle motor to stop, as would occur in a real vehicle upon the occurrence of a stall, and an indicator to be actuated to advise the student and instructor that the engine has stalled. Upon restarting the simulated engine, the stall indication is deactuated and the engine is restarted again as would occur in an actual vehicle.

Figure 4:
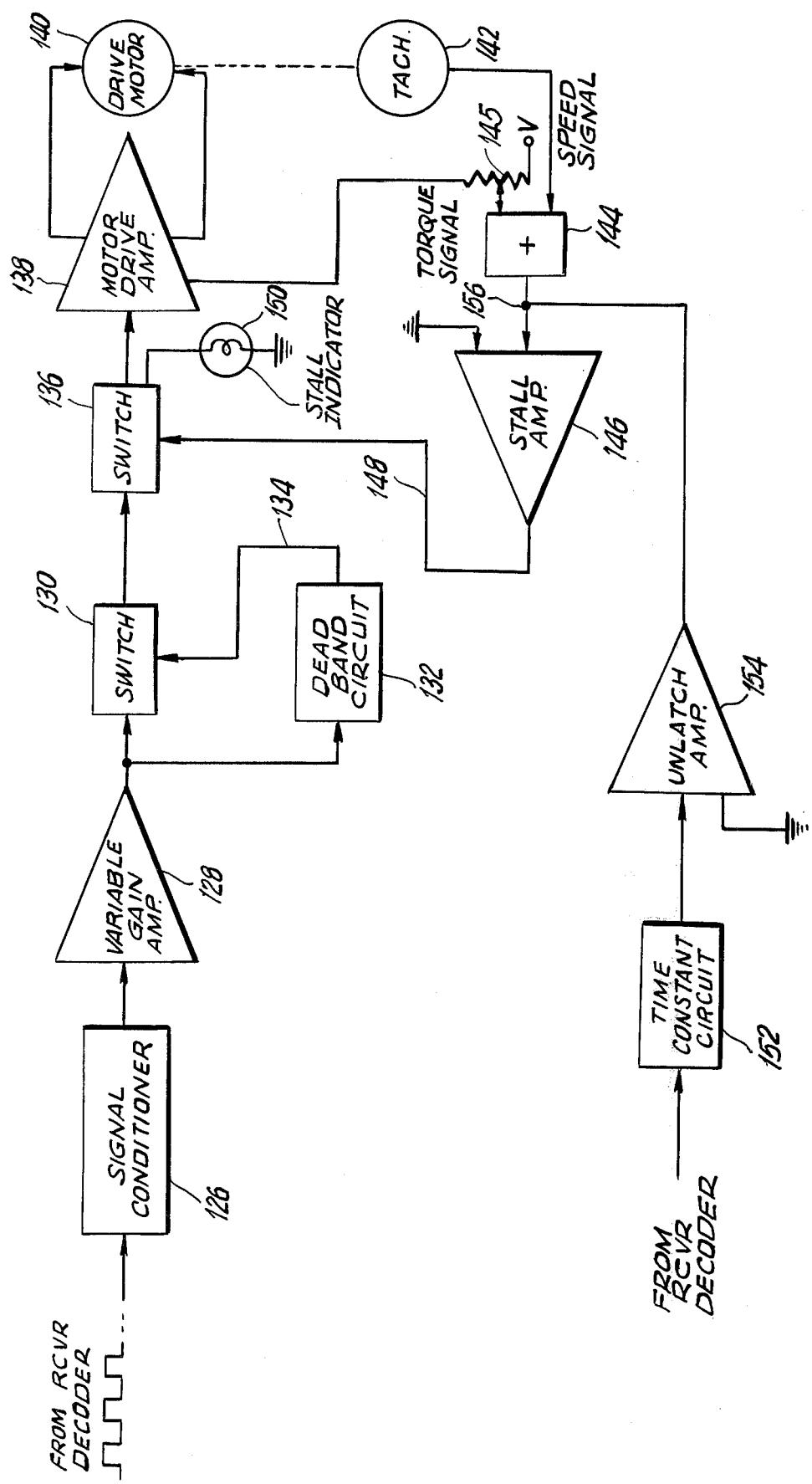
FIG. 4 is a schematic block diagram of the stall detector and indicator portion of the apparatus.

In the embodiment of the stall sensor and indicator shown schematically in FIG. 4, modulated signals, here shown as pulse-width modulated signals, are received from a receiver-decoder (not shown) which receives control signals from the console. Those modulated signals are applied to a signal conditioner 126 which converts the pulse-width modulated signal to a dc voltage having a magnitude proportional to the engine speed. That signal is applied to a variable-gain amplifier 128 the output of which is in turn applied to the input of a switch 130 and to the input of a "dead-band" circuit 132. The latter senses whether the magnitude of the voltage is outside a dead-band between a magnitude corresponding to a forward speed and one corresponding to a reverse speed. That is, when the control voltage is either greater or less than a predetermined band of voltage levels, circuit 132 produces a control signal on a line 134 to cause switch 130 to be conductive and to pass the control voltage to the input of a second switch 136. Switch 136, like switch 130, may be a silicon controlled rectifier (SCR) or a unijunction transistor (UJT) which is rendered conductive when a control signal is applied to a control electrode of the switch.

The output of switch 136, which is the amplified control signal from the input conditioner when switches 130 and 136 are both conductive, is applied to the input of a motor drive amplifier 138. The output of amplifier 138 is connected to a drive motor 140 which when energized causes the simulated vehicle 24 to move at a speed proportional to the speed of the motor.

To simulate the operation of an actual vehicle, a stall condition will occur for certain conditions of engine speed and torque. More specifically, a stall will occur, for certain torque values, if the engine speed is less than a predetermined value; for engine speeds exceeding this level, no stall will occur, irrespective of the engine torque.

In the operation of the stall indicator of FIG. 4, two signals, one proportional to motor speed and a second proportional to motor current and hence torque, are developed and processed to determine whether a stall condition exists. To this end, means, here shown as a tachometer 142 mechanically coupled to motor 138, is provided to provide a speed signal, that is, a voltage having an amplitude proportional to the engine (motor) speed. Alternately, the speed signal may be obtained from the voltage supplied to the drive motor.

The speed voltage developed by tachometer 142 is supplied to one input of a summer 144. The other input to summer 144 is a torque signal, which is a voltage proportional to the motor current and thus to the motor torque. The level of the torque signal can be adjusted by the control of a control variable resistance 145. The summed torque signal and speed signal is applied to one input of a stall differential amplifier 146 the other input of which is connected to a reference, here shown as ground. The output of stall amplifier 146 is applied over a line 148 to the control element of second switch 136, the output of which is connected to a stall indicator, here shown as a stall indicator lamp 150.

Also connected to the decoder is a time constant circuit 152, the output of which is connected to one input of an unlatch amplifier 154. The other input of amplifier 154 is connected to a reference, here shown as ground. The output of amplifier 154 is connected to the signal input of stall amplifier 146 at point 156.

In the operation of the stall indicator of FIG. 4, when switch 136 is conductive, the dc drive signal is applied to operate motor 140, and stall indicator lamp 150 is not energized. However, whenever the torque signal is greater than a predetermined level and the speed signal is below a certain level, indicating a stall condition, the sum (or difference) of the speed and torque signals is less than the reference (ground) and the polarity of the output signal is reversed, thereby producing a signal on line 148 to place switch 136 in the nonconducting condition, thereby removing the drive voltage from the motor and actuating the stall indicator lamp. In an alternative stall sensor circuit, the occurrence of a stall may be sensed by sensing only the speed of the motor in the vehicle, when it falls below a specified speed, indicating that the power supplied to the motor is insufficient to provide stall-free driving for the conditions under which the vehicle is being operated. In such a circuit, the motor speed can be derived either from a tachometer as shown in FIG. 4, or by sensing the magnitude of the reverse e.m.f. produced by the motor. That speed signal is then compared to a predetermined reference to produce a stall condition and indication as previously described whenenver the sensed speed signal falls below the reference. As before, the stall condition and indication are removed by restarting the "engine".

The stall condition and indication remains in effect until the student restarts the simulated engine by operating a control (not shown) in the console, much as a driver of an actual stalled vehicle would restart the vehicle. The operation of this control is effective to interrupt the decoded pulse signals to time-constant circuit 152 such that after a brief period the output of unlatch amplifier 154, which when applied to input of stall amplifier 146 at point 156, resets the output level of amplifier 146 to a value that causes switch 136 to be reset to a conducting condition, thereby restoring the drive signal to the motor. This, in turn, causes the system to be returned to the operating condition which remains in effect so long as the student avoids another stall condition by maintaining the proper engine speed consistent with the simulated driving conditions.

Figure 8:
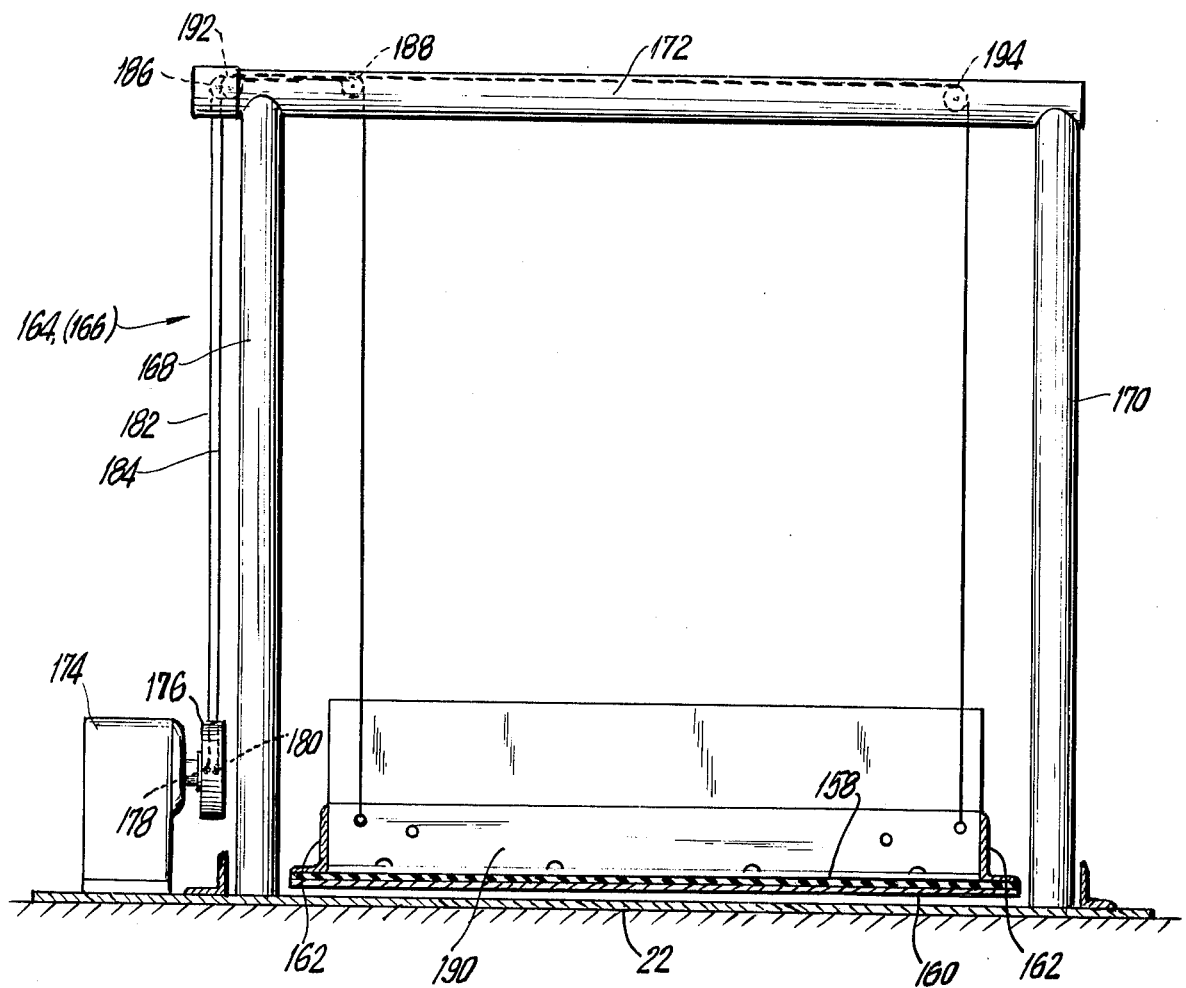
FIG. 8 is an end elevational view taken along the lines 8—8 in FIG. 2.

Those conditions can be modified under the control of the instructor by means of a device illustrated in FIG. 8 for modifying the grade or angle of the roadway over which the simulated vehicle is "driven" by the student. In this manner, the student can learn to adjust his driving operations to maintain proper vehicle operation on a graded road; that is, to prevent the vehicle from stalling for failure to provide sufficient fuel to the engine to compensate for the increased engine torque required to move the vehicle up the graded road.

As shown in FIG. 8, a roadway 158 in the form of a rubber surface is carried on a plate 160 to which a pair of angle brackets 162 are secured. Members 164 and 166 are respectively located at each end of roadway 158 and include spaced posts 168 and 170 and an upper cross bar 172. Located near each member 164, 166 is an electric motor 174 carrying a pulley 176. Pulley 176 carries on its circumference a pair of spaced pins 178 and 180 and strings 182 and 184 are respectively connected at one of their ends to pins 178 and 180.

String 178 passes over idler pulleys 186 and 188 rotatably mounted on cross bar 172 and its other end is attached to one side of a plate 190 extending between angle plates 162. Similarly, string 184 is passed over idler pulleys 192 and 194 rotatably mounted on cross bar 172 and is attached at its other end to the opposite side of plate 190. As shown in FIGS. 1 and 2, a similar arrangement of motor pulley strings and plates is provided at both ends of the roadway at members 164 and 166.

In the operation of the adjustable ramp device, the instructor actuates one of the motors 174 at either end of the roadway to cause one end of the roadway to be lifted off the surface of table 22. If desired, the roadway may also be tilted along its longitudinal axis to present an incline or bank condition for the vehicle, by raising, such as by the use of an additional pulley (not shown), one longitudinal edge of the roadway above the other longitudinal edge. In addition, bumps or holes may be provided in the roadway to produce a closer simulation of actual road conditions to the student driver.

Figure 9:
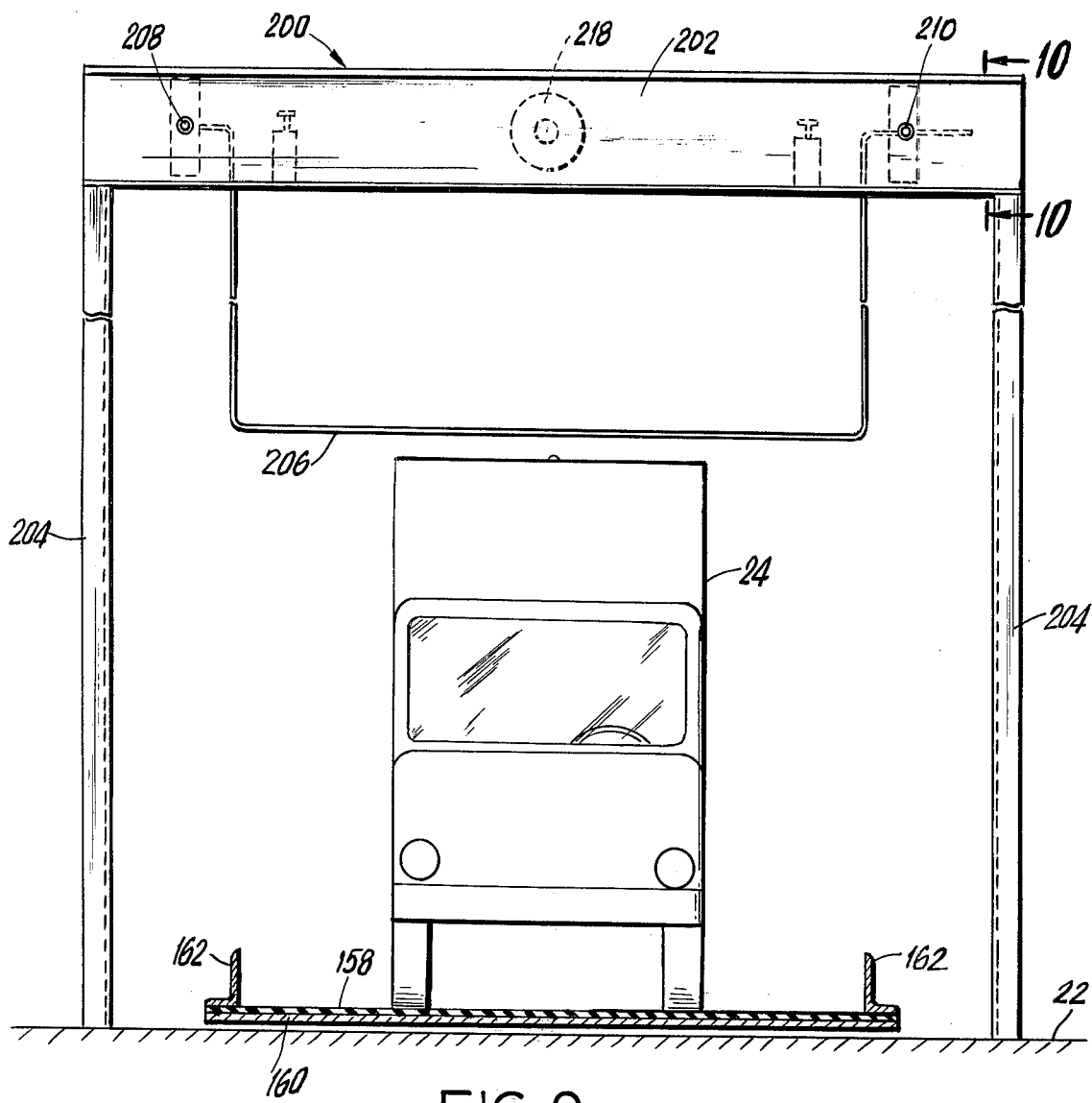
FIG. 9 is an elevational view viewed along the lines 9—9 of FIG. 2.
Figure 10:
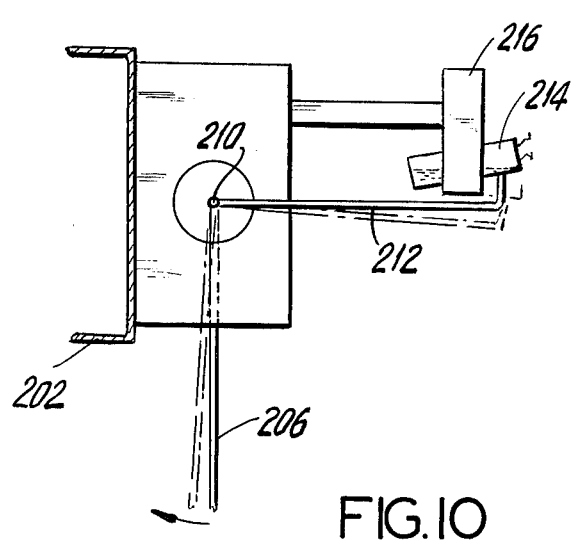
FIG. 10 is a fragmentary view, partly in section, as viewed along the lines 10—10 of FIG. 9.

FIGS. 9 and 10 illustrate another aspect of the invention used to train the student in judging vertical clearance of his vehicle, particularly when the roadway is graded, or banked in the manner just described. As therein shown, as well as in FIG. 1, an intermediate member 200 is positioned over the roadway at an approximate central portion thereof. Member 200 includes a cross member 202 carried by a pair of vertical supports 204 which are placed alongside the roadway.

The ends of a bar 206 are pivotably attached to member 202 at spaced pivot locations 208, 210. Also secured at the pivot locations is an arm 212 (FIG. 10) which has its other end in contact with a mercury switch 214 supported in a bracket 216. Switch 214 is electrically connected in circuit with a voltage source (not shown) and a suitable indicator, here shown as buzzer 218. When the roadway is lifted so that when vehicle 24 traveling up the roadway and beneath member 202, contacts bar 206, this contact will cause switch 214 to be actuated, thereby energizing indicator 218 so that the student is apprised that he has failed to pass safely under the simulated vertical clearance limitation under the given grade conditions of the roadway, as desired.

It will thus be appreciated from the foregoing description of the driver training simulator of the invention, that a simulator has been provided that gives the student driver a more realistic and lifelike driving experience, without ever driving an actual vehicle. More specifically, the student experiences the actual feel of a clutch pedal and steering wheel. Moreover, if the student does not properly operate the simulated vehicle it will stall, as in an actual vehicle. The system of the invention thus significantly improves the driving learning experience and reduces the time needed for the student to learn to properly operate an actual vehicle.

It will also be appreciated that although the invention has been herein described with respect to one embodiment thereof, modifications to this embodiment may be apparent to those skilled in the art without necessarily departing from the spirit and scope of the invention.

What is claimed is:

1. In a driver training simulator including simulated controls of a vehicle including a steering wheel, an accelerator pedal, and a brake pedal, and a reduced-size vehicle the movements of which are controlled by the operation by a student driver of one or more of said controls, the improvement which comprises: means for sensing whether the reduced-size vehicle is at rest or in motion, and means for producing a first resistance to the rotation of said steering wheel of a first magnitude when the reduced-size vehicle is at rest and for producing a second resistance to the rotation of said steering wheel of a second magnitude less than that of said first magnitude when the reduced-size vehicle is in motion.

2. The simulator of claim 1, in which the stimulated controls further include a clutch pedal, and further comprising means for producing a resistance to the movement of the clutch pedal over a predetermined distance prior to simulated clutch disengagement, and means for producing an increased resistance to the movement of the clutch pedal following the initiation of simulated clutch disengagement upon further movement of the clutch pedal.

3. The simulator of claim 2, in which the reduced-size vehicle includes an electric motor for driving the vehicle, and further comprising means for producing a signal bearing a relation to the speed of said motor, and means for producing a simulated stall condition in said vehicle when said speed signal is below a predetermined value.

4. The simulator of claim 3, further comprising means for producing a signal bearing a relation to the torque of said motor, said stall condition producing means further comprising means for comparing the relative magnitudes of said torque and said speed signals.

5. The simulator of claim 4, in which said stall condition producing means comprises means for deactuating said motor upon the sensing of a stall condition.

6. The simulator of claim 5, further comprising means for indicating the existence of said stall condition upon the production of said simulated stall condition.

7. The simulator of claim 6, further comprising means for modifying the grade along which the vehicle moves.

8. The simulator of claim 5, further comprising means for reactuating said motor upon the removal of the stall condition.

9. The simulator of claim 5, in which said stall condition producing means includes means for operatively summing said speed and torque signals, and means for comparing said summed signals against a reference.

10. The simulator of claim 3, in which said rotation-resistance producing means includes means for producing a first control signal when the vehicle is at rest and a second control signal when the vehicle is in motion, brake means capable of producing a resistance force at one of said first and second magnitudes in accordance with said control signal, and means for applying said control signal to said brake means.

11. The simulator of claim 10, in which said brake means comprises a magnetic brake, and said signal producing means includes means capable of selectively producing signals at one of two levels and switch means operable between a first condition when the vehicle is at rest and a second condition when the vehicle is in motion, said signal producing means producing a signal of a first level when said switch means is in said first condition and for producing a signal at a second level when said switch is in said second condition.

12. The simulator of claim 10, in which said clutch pedal movement resistance-producing means comprises a first member for providing an initial resistance to movement of the clutch pedal over said predetermined distance, and a second member providing additional resistance to that offered by said first member when the clutch pedal is moved beyond the point of simulated clutch disengagement.

13. The simulator of claim 12, in which said first and second members respectively include first and second springs, said second spring having a higher spring constant than that of said first spring.

14. The simulator of claim 13, further comprising drive means operatively coupled to the clutch pedal for movement therewith for compressing only said first spring when the clutch pedal is moving along said initial predetermined distance, and means for compressing both of said first and said second springs when the clutch pedal is moved additionally beyond said predetermined distance.

15. The simulator of claim 14, in which said first and second springs are axially aligned with respect to one another, said drive means comprising a rod carrying a first member at one end thereof for operatively engaging and compressing said first spring upon the initial movement of said drive means and a second member spaced from said first member and carried by said drive means for operatively engaging and compressing said second spring.

16. The simulator of claim 1, in which the reduced-size vehicle includes an electric motor for driving the vehicle, and further comprising means for producing a signal bearing a relation to the speed of said motor, and means for producing a simulated stall indication in said vehicle when said speed signal is below a predetermined value.

17. The simulator of claim 16, further comprising means for modifying the grade along which the vehicle moves.

18. The simulator of claim 17, further comprising means for deactuating said motor upon the occurrence of a simulated stall condition, and means for reactuating said motor upon the removal of the stall condition.

19. The simulator of claim 18, further comprising means for indicating the existence of a stall condition upon the production of a simulated stall condition.

20. The simulator of claim 1, in which said rotation-resistance producing means includes means for producing a first control signal when the vehicle is at rest and a second control signal when the vehicle is in motion, brake means capable of producing a resistance force at one of said first and second magnitudes in accordance with said control signal, and means for applying said control signal to said brake means.

21. The simulator of claim 20, in which said brake means comprises a magnetic brake, and said signal producing means includes means capable of selectively producing signals at one of two levels and switch means operable between a first condition when the vehicle is at rest and a second condition when the vehicle is in motion, said signal producing means producing a signal of a first level when said switch means is in said first condition and for producing a signal at a second level when said switch is in said second condition.

22. The simulator of claim 21, in which said brake means includes a first section mounted on the steering shaft for rotation therewith, and a second section axially movable along the shaft toward and away from said first section in accordance with the magnitude of said control signal, thereby to respectively increase or decrease the resistance offered by said brake means to the rotation of the steering wheel, said control signal being applied by said applying means to one of said first and second sections.

23. The simulator of claim 22, further comprising first spring means secured respectively to circumferential points on one of said first and second sections for respective expansion and contraction upon the rotation of the steering wheel shaft.

24. The simulator of claim 21, in which said clutch pedal movement resistance-producing means comprises a first member for providing an initial resistance to movement of the clutch pedal over said predetermined distance, and a second member providing additional resistance to that offered by said first member when the clutch pedal is moved beyond the point of simulated clutch disengagement.

25. The simulator of claim 24, in which said first and second members respectively include first and second springs, said second spring having a higher spring constant than that of said first spring.

26. The simulator of claim 25, further comprising drive means operatively coupled to the clutch pedal for movement therewith for compressing only said first spring when the clutch pedal is moving along said initial predetermined distance, and means for compressing both of said first and said second springs when the clutch pedal is moved additionally beyond said predetermined distance.

27. The simulator of claim 26, in which said first and second springs are axially aligned with respect to one another, said drive means comprises a rod carrying a first member at one end thereof for operatively engaging and compressing said first spring upon the initial movement of said drive means and a second member spaced from said first member and carried by said drive means for operatively engaging and compressing said second spring.

28. The simulator of claim 2, in which said clutch pedal movement resistance-producing means comprises a first member for providing an initial resistance to movement of the clutch pedal over said predetermined distance, and a second member providing additional resistance to that offered by said first member when the clutch pedal is moved beyond the point of simulated clutch disengagement.

29. The simulator of claim 28, in which said first and second members respectively include first and second springs, said second spring having a higher spring constant than that of said first spring.

30. The simulator of claim 29, further comprising drive means operatively coupled to the clutch pedal for movement therewith for compressing only said first spring when the clutch pedal is moving along the initial predetermined distance, and means for compressing both of said first and said second springs when the clutch pedal is moved additionally beyond said predetermined distance.

31. The simulator of claim 30, in which said first and second springs are axially aligned with respect to one another, said drive means comprising a rod carrying a first member at one end thereof for operatively engaging and compressing said first spring upon the initial movement of said drive means and a second member spaced from said first member and carried by said drive means for operatively engaging and compressing said second spring.

32. In a driver training simulator including simulated controls of a vehicle and a reduced-size vehicle whose movement is controlled by the operation of one or more of said controls, said vehicle including an electric drive motor, the improvement which comprises: first means for producing a first signal bearing a relation to the speed of said motor, second means for producing a second signal bearing a relation to the torque of said motor, and means operatively coupled to said first and second signal producing means and including means for comparing the relative magnitudes of said first and second signals for producing a simulated stall condition in said vehicle at predetermined levels of said first and second signals.

33. The simulator of claim 32, further comprising means for modifying the grade along which the vehicle moves.

34. The simulator of claim 32, further comprising means for deactuating said motor upon the occurrence of a simulated stall condition, and means for reactuating said motor upon the removal of the stall condition.

35. The simulator of claim 32 in which said stall condition creating means includes means for operatively summing said torque and said speed signals, and means for comparing said summed torque and speed signals against a reference.

36. The simulator of claim 34, further comprising means for indicating the existence of a stall condition upon the production of a simulated stall condition.

37. A driver training simulator including simulated controls of a vehicle including a clutch pedal, means for producing a varying resistance to the movement of the clutch pedal corresponding to the movement thereof, and a reduced-size vehicle whose movement is controlled by the operation of one or more of said controls, said varying-resistance producing means comprising a first resistance member for providing an initial gradually increasing resistance to movement of the clutch over a predetermined distance to a point simulating clutch disengagement, and a second resistance member axially aligned with and axially spaced from said first resistance member for providing additional resistance to that offered by said first member as the clutch pedal is moved beyond said predetermined distance.

38. The simulator of claim 37, in which said first and second members respectively include first and second springs, said second spring having a higher spring constant than that of said first spring.

39. The simulator of claim 38, further comprising drive means operatively coupled to the clutch pedal for movement therewith for compressing only said first spring when the clutch pedal is moving along said initial predetermined distance, and means for compressing both of said first and said second springs when the clutch pedal is moved additionally beyond said predetermined distance.

40. The simulator of claim 39, in which said drive means comprises a rod carrying a first member at one end thereof for operatively engaging and compressing said first spring upon the initial movement of said drive means and a second member spaced from said first member and carried by said drive means for operatively engaging and compressing said second spring.

* * * * *